July 19, 1960
R. BOLGIANO, JR., ET AL
2,946,044
SIGNAL PROCESSING SYSTEM
Filed Aug. 9, 1954
6 Sheets-Sheet 2
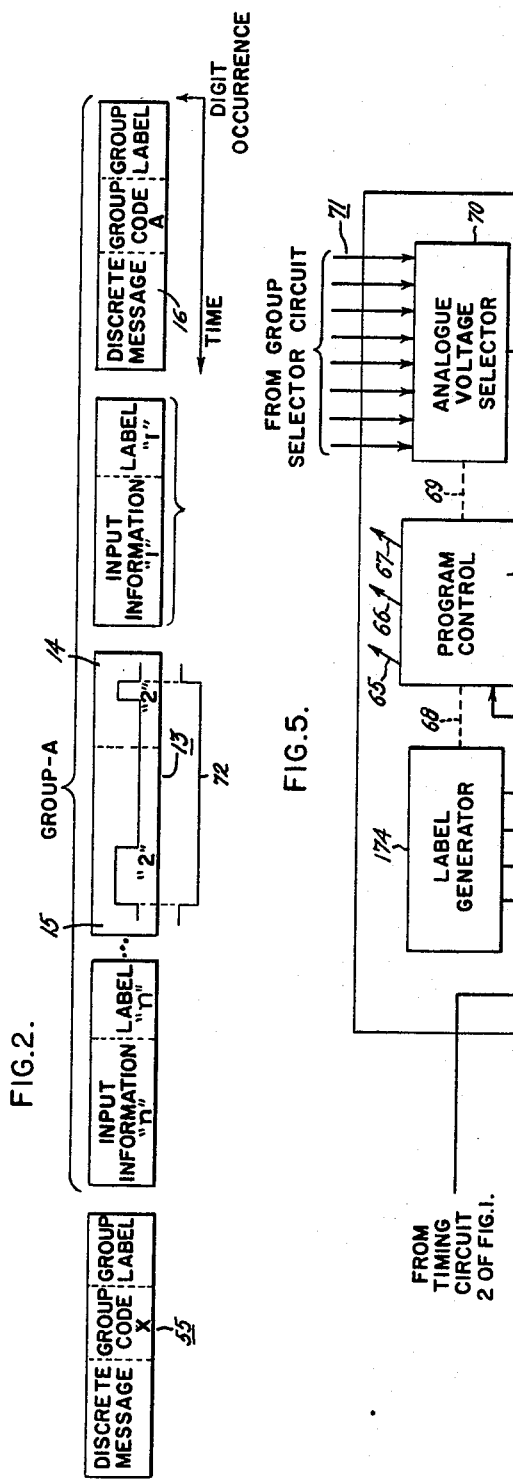
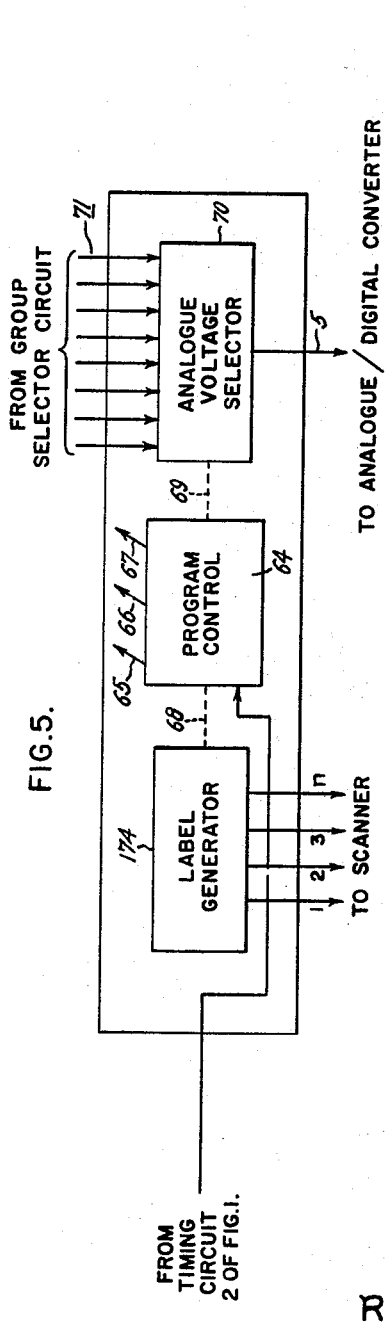
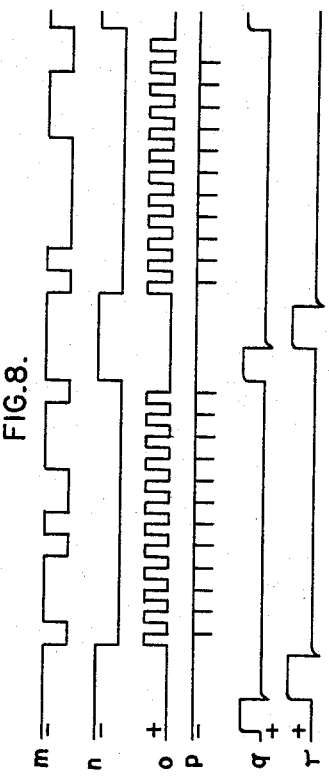
Inventors:
Ralph Bolgiano Jr.,
Daniel T. Hurley,
William R. Krafft,
by Charles M. Hutchins
Their Attorney.

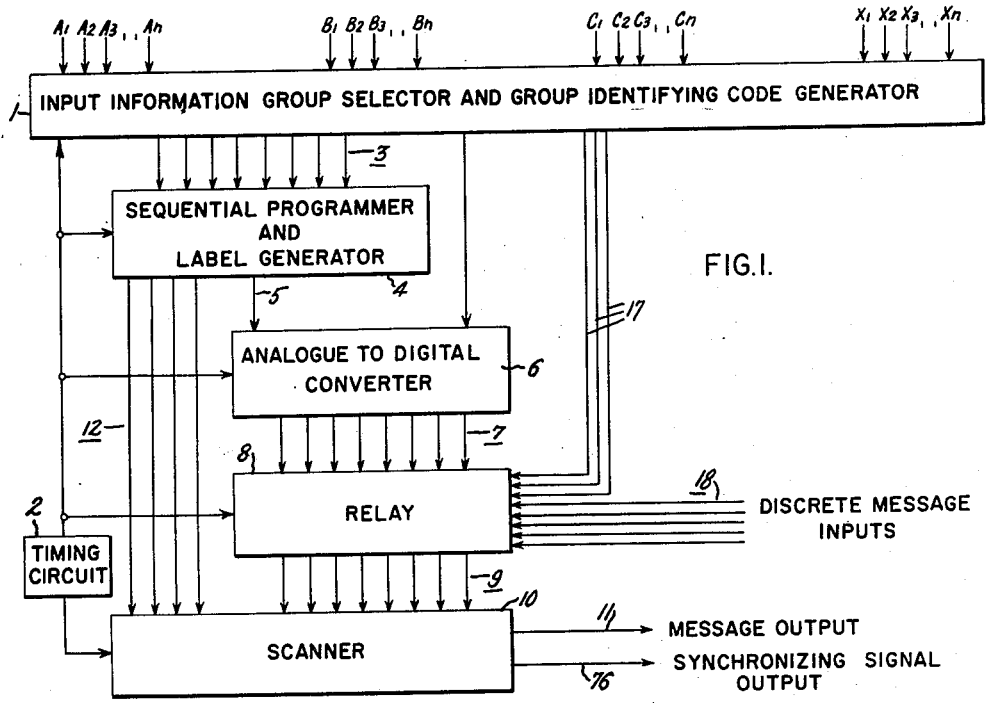
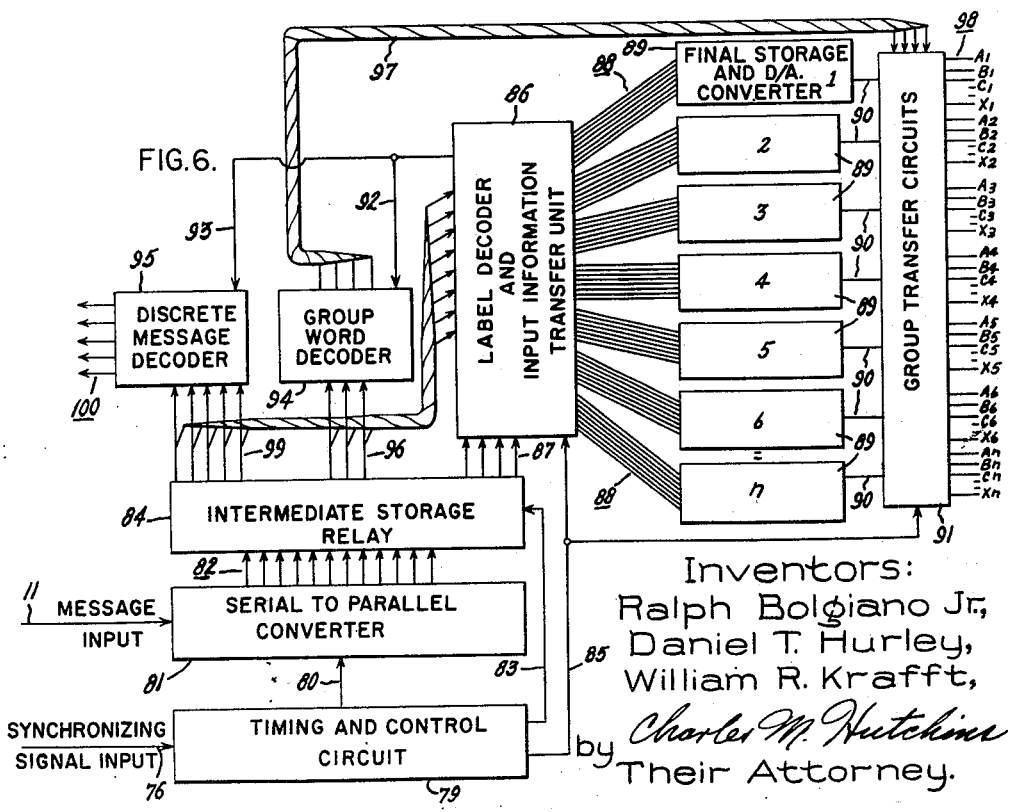

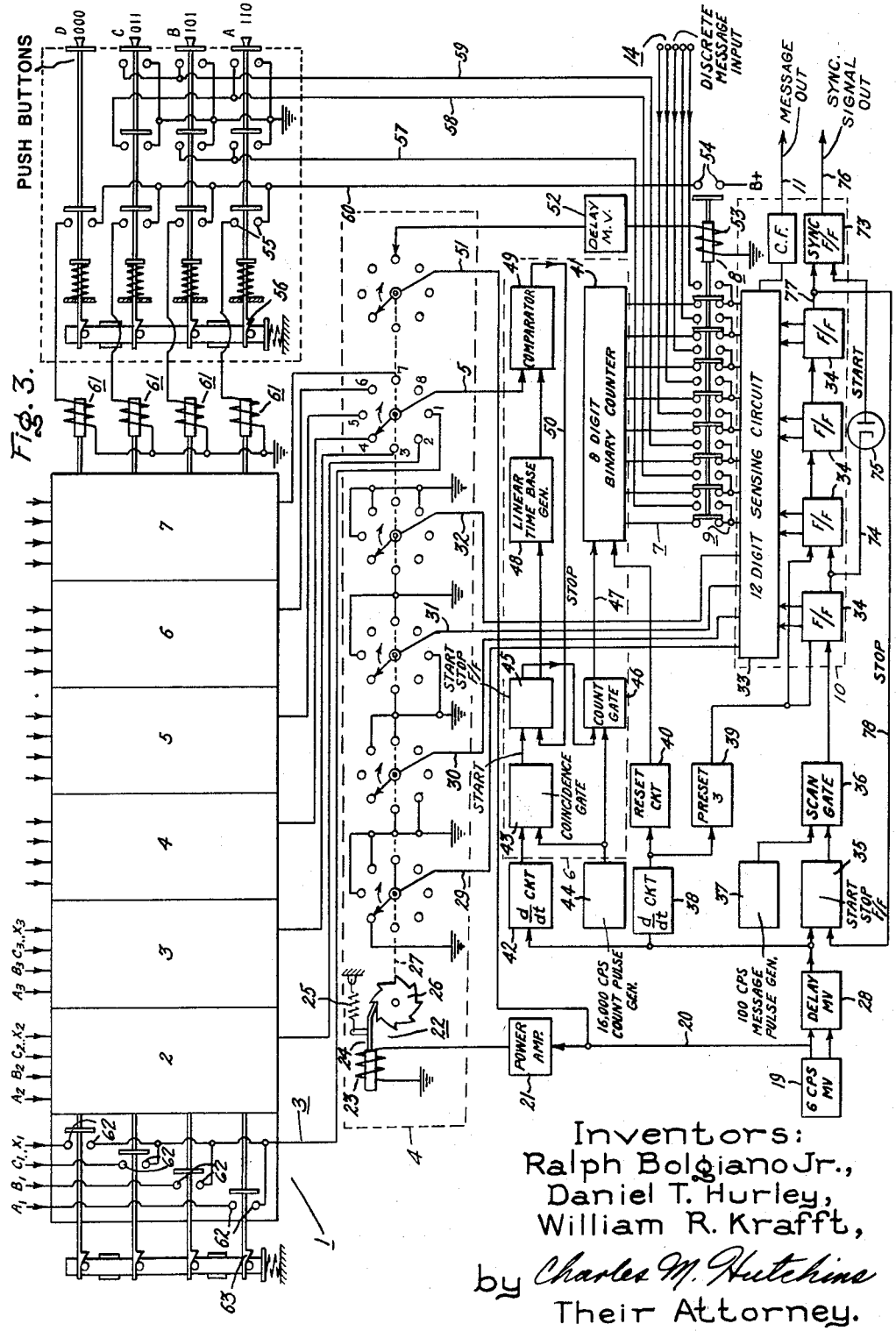

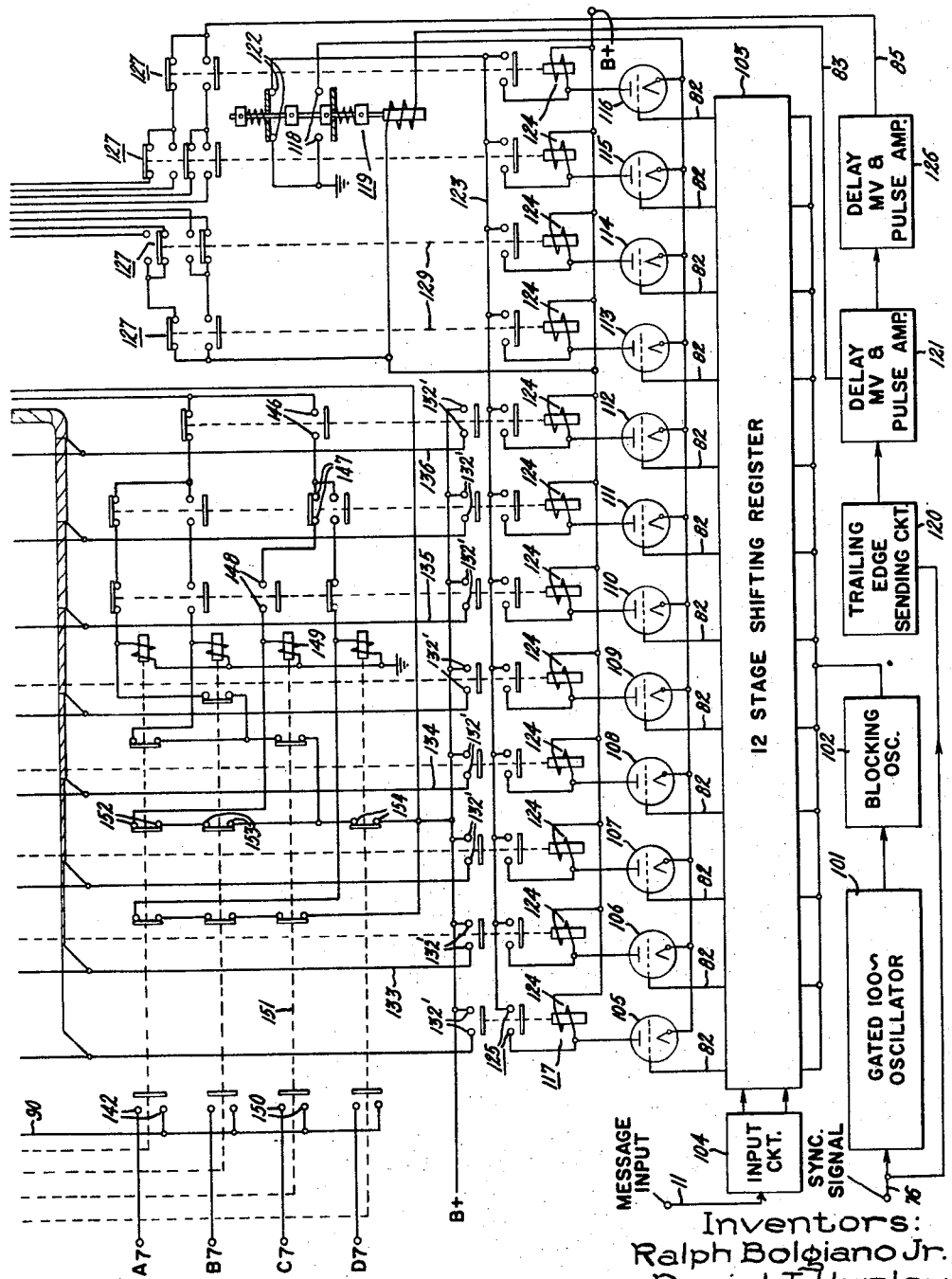

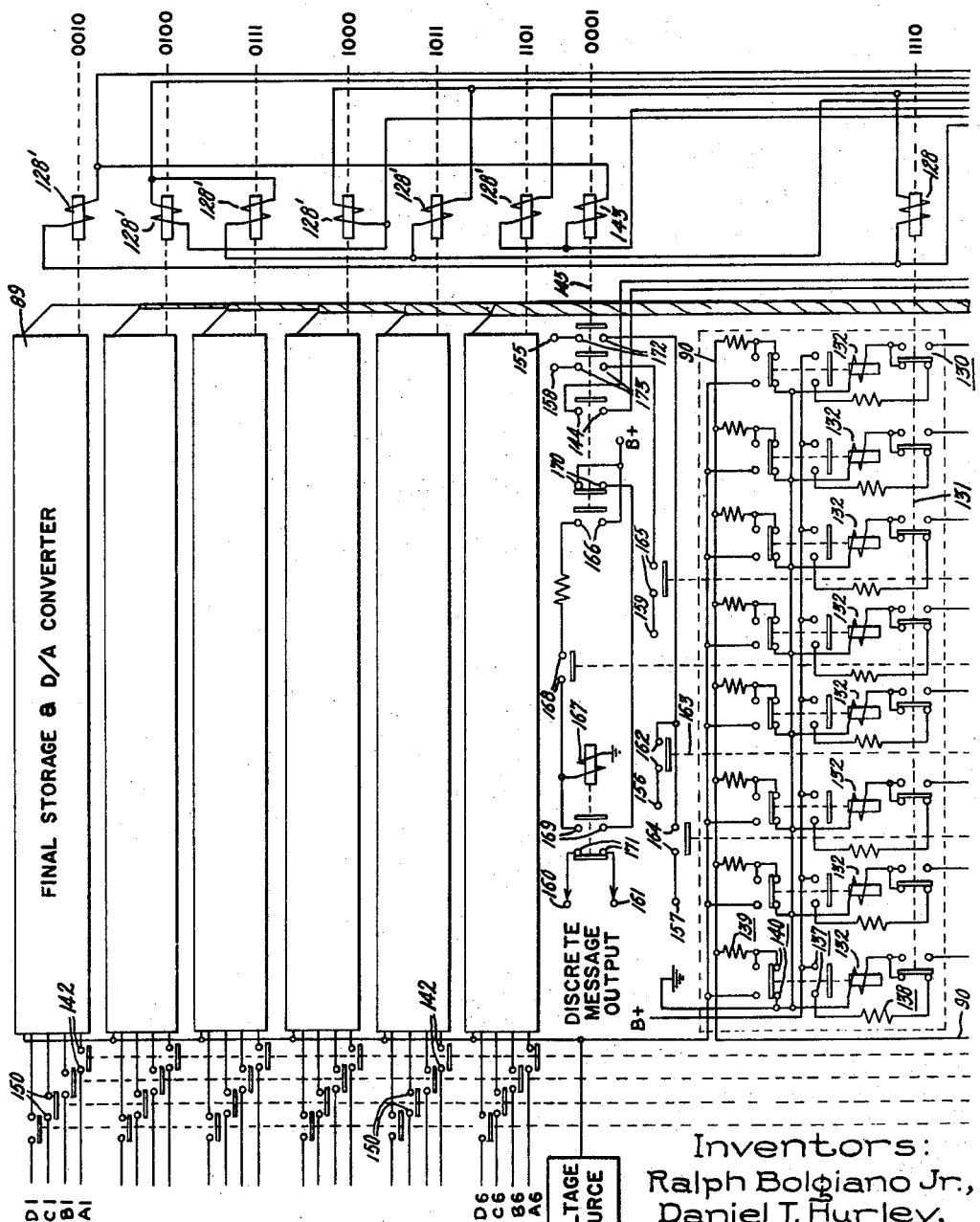

United States Patent Office 2,946,044
Patented July 19, 1960

2,946,044

SIGNAL PROCESSING SYSTEM

Ralph Bolgiano, Jr., Ithaca, Daniel T. Hurley, Syracuse, and William R. Krafft, Whitesboro, N.Y., assignors to General Electric Company, a corporation of New York Filed Aug. 9, 1954, Ser. No. 448,446

21 Claims. (Cl. 340—174)

This invention relates to signal processing systems and particularly to a method and means for processing a plurality of signals through common apparatus.

A need often arises for communicating a plurality of information with high accuracy and a minimum of bandwidth. In order to obtain the prescribed degree of accuracy of transfer of information, digital techniques have often been employed. One approach is to sequentially sample and transmit the plurality of information in digital form to a receiving unit for control or information purposes by employing a system of time division multiplexing. The problem exists, however, of providing versatility in the program selection and the amount and order of information transmitted while enabling the receiving unit to sort out the multiplexed information with high accuracy.

Accordingly, one object of this invention is to provide an improved method and means of communications.

Another object of this invention is to provide an improved method and means for processing signals.

Another object of this invention is to provide an improved digital time multiplexed signal transfer system.

Another object of this invention is to provide a novel communication arrangement employing a system of word and word group labeling.

Another object of this invention is to provide novel circuitry for improving the flexibility of programming of time division multiplex signals in digital form.

Another object of this invention is to provide an improved conversion system for operation with analogue and digital type signals.

Another object of this invention is to provide an improved system for distributing information transmitted in digital form to proper output circuits.

Another object of this invention is to provide an improved method and means for communicating information at high speeds.

Another object of this invention is to simultaneously transmit a portion of a message in binary form while converting analogue information to be subsequently transmitted to digital form.

Another object of this invention is to produce an improved method and means of communication employing time division multiplexed pulses in combination with synchronizing signals.

A still further object of this invention is to provide improved timing circuits for communication purposes.

The novel features which we believe to be characteristic of our invention are set forth with particularity in the appended claims. Our invention itself, however, both as to its organization and method of operation together with further objects and advantages thereof may best be understood by reference to the following description taken in connection with the accompanying drawings wherein:

Fig. 1 discloses the transmitter portion of applicants' invention in block diagram form;

Fig. 2 illustrates diagrammatically the information bearing structure of a time multiplexed pulse train;

Fig. 3 illustrates in block diagram form, partly diagrammatic, one embodiment of the transmitter portion of the invention;

Fig. 5 illustrates, in block diagram form, a further embodiment of the transmitter portion of the invention;

Fig. 6 illustrates in block diagram form, the receiver portion of the present invention;

Figs. 7A and 7B are circuit diagrams, partially diagrammatic, of the receiver portion of the present invention; and Fig. 8 illustrates wave forms useful in explaining the operation of Figure 7.

Figure 4:
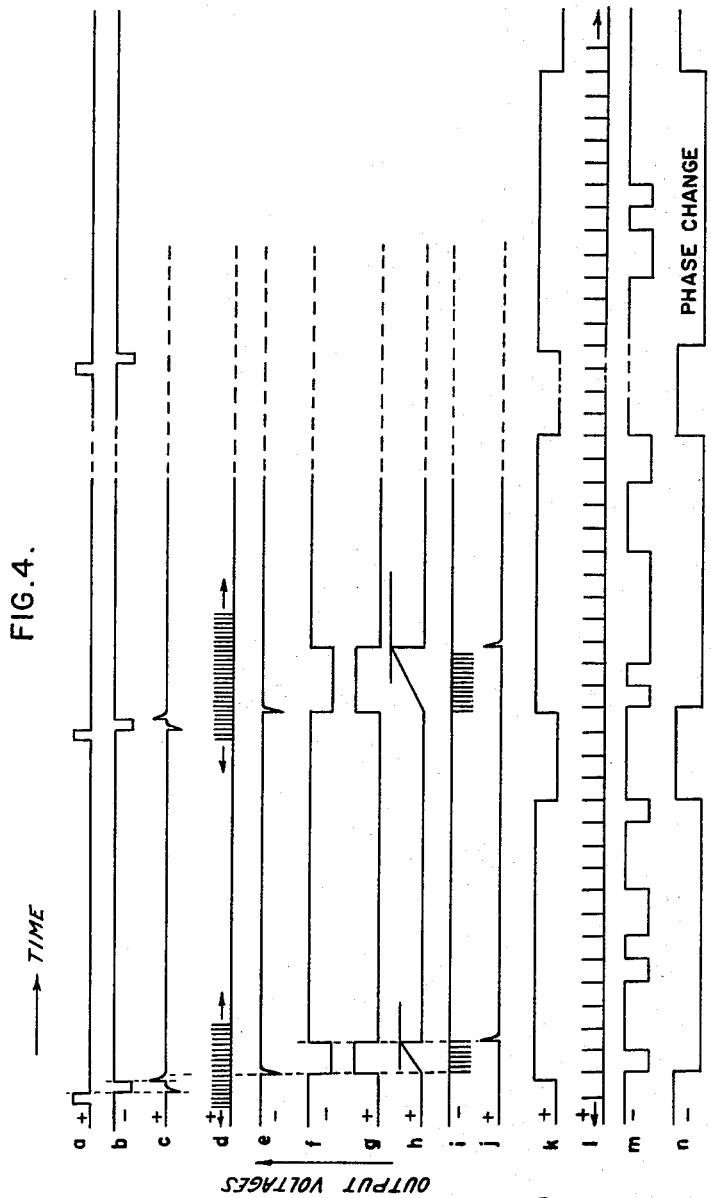
Fig. 4 illustrates wave forms useful in explaining the operation of the arrangement of Figure 3.

In accordance with one embodiment of the invention applicable to signal communication, a plurality of different analogue information is processed and transmitted in coded form to a receiving station where it is decoded and made available for use. The information, while in analogue form is sampled sequentially in a desired order. A label, identifying the particular analogue information being sampled, is transmitted while the analogue information is being converted into digital form. The digital information is transmitted immediately after the identifying label. Coincident with the transmission of the label and information a synchronizing signal is sent to the receiving unit for timing purposes.

At the receiver, each transmitted information and associated label in serial form are processed, and supplied in parallel form to an intermediate storage unit under the control of the synchronizing signal. From the intermediate storage unit, these parallel available signals are separated as to label and information and the separated information is routed to respective output apparatus where it is stored under the control of the received label information. Versatility of system operation is provided by transmitting group identifying information in digital form enabling the information stored in each output apparatus to be selectively transferred to one of several output terminals depending on the group information originating from the transmitting source.

Referring to Fig. 1 there is shown a plurality of information input leads $A_1 \ldots A_n$, $B_1 \ldots B_n$, $X_1 \ldots X_n$. Each input lead carries a predetermined information such as the value in analogue form of a particular control voltage, the value of a speed function, a meter value reading, etc. which is to be transmitted as a message group such $A_1, A_2, A_3 \ldots A_n$, or $B_1, B_2, B_3 \ldots B_n$, or $X_1, X_2, X_3 \ldots X_n$, etc. It is further desired that selected ones of these message groups be transmitted repeatedly, or the groups combined in a desired time sequence pattern under the control of the transmitting station. This is accomplished in the following manner. The input information group selector circuit and group identifying code generator 1 operate under the control of the timing circuit 2 to select a group of information inputs such as $A_1, A_2, A_3 \ldots A_n$ for application over separate output leads 3 to the sequential programmer and label generator 4. This selected group of input information is sequentially applied under control of the timing circuit 2 over lead 5 to the analogue to digital converter 6. The analogue to digital converter 6 operates to convert the value of each analogue input information signal available on lead 5 into digital form. In accordance with one embodiment to be described shortly, the value of the analogue voltage on lead 5 is converted to a binary count and made available in binary pulse code form on a plurality of eight output leads 7. A relay unit 8 operates under control of the timing circuit 2 to transmit the binary version of the selected input signals available over leads 7 to the scanner circuit 10 by way of leads 9. The scanner circuit 10 operates under control of the timing circuit 2 to sequentially scan the digital information available in parallel binary form on leads 9 and produce a corresponding output signal on lead 11 in the form of a binary coded pulse train. In order that the transmitted pulse train available on lead 11 may be properly identified as to subject mater, that is, describing a speed, control voltage function etc. at a remote receiving unit, the sequential programmer and label generator 4 operates to provide an appropriate label information in binary form over leads 12. The scanner 10 is arranged to read the binary label available on leads 12 before the information available on leads 9 such that the output message on lead 11 comprises a first portion in the form of a label identifying the type of input information to follow, and a second or following portion carrying the value or signal of the identified input information. The label and related input information may then be transmitted over lead 11 to a remote receiving station as a continuous pulse train or pattern. The nature of the transmitted pulse pattern can clearly be seen by reference to block 13 of Fig. 2 showing a typical waveform. The first portion 14 comprises the label information identifying that the particular message being transmitted carries subscript 4 type information, and the remaining portion 15 comprises the value or signal of the subscript 4 type information.

Referring to Fig. 1 again, the sequential programmer and label generator 4, as previously mentioned, operates to transfer each analogue input, bearing subscripts 1 . . . n of a selected group, say group A, sequentially over lead 5 for conversion to digital form in converter 6. The remainder of the system previously described then sequentially converts the analogue values of the successive type inputs to digital form which are then serially transmitted as a message group over lead 11. Fig. 2 shows such a grouping.

In addition to being able to transmit a plurality of information from a particular group of inputs, say A of Fig. 1, the present invention is also capable of selectively programming and transmitting the information associated with other information groups such as B, C . . . X. In order that any selected message group may be properly identified and routed at a receiving station, a group identifying message is transmitted as shown at 16 of Fig. 2. This message comprises a group label portion to indicate upon receipt at a remote receiving station that a group identifying message will follow, and a group code or message portion identifying that the information messages to follow are of a particular group A, B, C . . . or X. For example, after say an A type information message group has been transmitted, it is desired to transmit a group of B type of information messages. The sequential programmer and label generator transmits at the appropriate time, determined by circuit 2, a group level over leads 12 to the scanner 10. The input information group selector and group identifying code generator 1 transmits a group identifying code for information B over leads 17 to the relay unit 8 for application to the scanner 10. The scanner reads out the group label available on leads 12 and then reads out the group code or identifying message made available on leads 9 by relay 8 as part of the same group message. A group of messages, therefore, comprises a group identifying message followed by a plurality of related input information messages. As shown in Fig. 2, the group identifying message also comprises a discrete message portion for communicating discrete information or signals in addition to that available in the input information portions 15 of a message group.

In Fig. 1, the discrete message inputs, which may be "yes" or "no" type messages, are applied over leads 18 to the relay unit for application at the proper time to the scanner unit 10 for transmittal over lead 11 as part of the group identifying message sequence.

In the subsequent figures of the drawings, wherever possible, common reference numerals are retained to identify similar items in order to simplify the overall explanation of the invention.

Referring to Fig. 3 there is shown a detailed embodiment of the invention. The master timing control for the transmitter portion of the communication system comprises a multivibrator 19 delivering asymmetrical control pulses at a 6 cycle per second rate as shown in Fig. 4a. It is the narrower of these pulses which is actually employed to control the timing of the various circuit operations. A narrow control pulse from 19 is applied over lead 20 to the power amplifier 21 where it is amplified to a level suitable to operate the rotary switch 22. Upon application of the control pulse to solenoid 23, the armature 24 is drawn away from the restraining spring 25 for the duration of the control pulse. At the conclusion of the control pulse, the armature 24 is released, engaging the ratchet gear 26 in a manner to provide a step rotation of the shaft 27 shown in dotted form. The shaft 27 operates to control various switching operations involving transfer of the input information to the analogue to digital converter 6, and label information to the scanner 10 in a manner to be described shortly. The shaft 27 also operates to control the time when the group identifying message is transmitted.

The trailing edge of the control pulse available from 19 is applied to a multivibrator 28 which operates effectively to provide a control pulse Fig. 4b for delaying the encoding and transmission process until the rotary switch 27 has been driven to a new switch position. Assuming, for purposes of discussion, that the rotary switch has operated and the various switch positions associated with shaft 27 are as shown in Fig. 3, leads 29, 30, 31, and 32, which were previously identified in Fig. 1 by the numeral 12, apply a ground or open circuit signal to the sensing circuit 33 of the scanner 10. For example, in the switch position shown, lead 29 applies a ground signal, and leads 30, 31 and 32 apply an open circuit signal to the sending circuit 33. This set of signal conditions, identified by the binary code designation 1000, represents input information associated with input leads of the subscript 4 type previously described in connection with Fig. 1. The binary signals simultaneously available on leads 29 through 32 in parallel form, are made available as a serial train of binary pulses on lead 11 upon operation of the scanner circuit 10. The scanner comprises four flip-flop circuits 34, operating as scale of 13 counting chain to cause the sensing circuit 33 to successively sense the signal conditions existing in parallel form on the input leads 29 through 32, and to deliver corresponding binary signals in serial form to lead 11. Briefly, the scanner flip-flops are operated as follows: Initially it is assumed that the scanner flip-flops 34 have a count of zero stored in them at the start of a sequence of operation. The trailing edge of the delayed control pulse from multivibrator 28 is applied to a start-stop flip-flop circuit 35 which opens a scan gate circuit 36 permitting scanning pulses from generator 37 to be applied at a 100 cycle per second rate to the input of the scanner chain comprising the flip-flop circuits 34. The scanning flip-flop circuits 34 operate in a well known manner as a counter to successively enable the sensing circuit 33 to sense the input information available on the leads 29 through 32. For further details of the operation of the sensing and flip-flop circuit arrangements, reference may be made to U.S. Patent No. 2,811,713 George Spencer entitled Signal Processing Circuit, filed March 9, 1954, and assigned to the same assignee. As is well known in the digital computer art, the cascaded chain of four flip-flop circuits ordinarily operates as a scale of 16 counter. Since only 12 binary signal conditions and an "off" condition are required to be successively sensed, it becomes necessary that the scanning chain be modified to count to 13. This is accomplished by differentiating the delayed control pulse from multivibrator 28, in circuit 38, and applying the resultant differentiated leading edge pulse to a preset three circuit 39. The output of the preset three circuit, which may comprise a cathode follower, is applied to the scanning flip-flops 34 causing them to store an initial count of three before the scanning pulses from scan gate 36 are applied to commence a cycle of scanning operation. The differentiated leading edge pulse from 38 is also applied to a reset circuit 40 which operates similarly to circuit 39 to reset the binary counter 41 to its zero count condition. As will be described shortly, counter 41 cooperates with other circuitry to be described shortly in effecting the analogue to digital conversion of the analogue signals.

While the scanning chain is reading out the binary information available on leads 29 through 32, the analogue to digital converter 6 is simultaneously operating to convert the input information, made available on lead 5 from the input of the sequential programmer and label generator 4, by operation of shaft 27, to digital form in the following manner. The trailing edge of the delayed control pulse from the multivibrator 28 is differentiated in circuit 42, see waveform Fig. 4e, before application to the coincidence gate circuit 43. The coincidence gate circuit 43 operates to pass only one of the count pulses, Fig. 4d, available from generator 44, to the start-stop, flip-flop circuit 45 causing it to change its state of operation as shown in Fig. 4f. One of the output signals, Fig. 4g, from the start-stop, flip-flop circuit opens the count gate 46 permitting pulses 4d to be applied at a 16,000 cycle per second rate over lead 47 to the eight digit binary counter circuit 41. At the same time that the count gate 46 is opened, the other output signal, Fig. 4f, from 45 is delivered by the start-stop, flip-flop circuit 45 to the linear time base generator 48 causing it to produce an output voltage, Fig. 4h, varying at a linear rate with time. This linearly varying voltage is applied to the comparator circuit 49 for comparison with the amplitude of the analog information available over lead 5. The comparator 49 operates upon an equality of the amplitudes of the analog signal available on lead 5, and the output signal of generator 48 to deliver a control pulse, Fig. 4j, over lead 50 to the start-stop flip-flop 45, causing it to return to its original condition or state of operation. The resultant signal condition, Fig. 4g, closes the count gate 46, preventing further count pulses from generator 44 from being applied to the binary counter circuit 41, and also resets the linear time base generator 48 to its original condition. Thus, depending upon the time it takes for equality of the analogue information and the time base signal, Fig. 4h, to be reached after the start of operation of the binary counter 41, a corresponding number of pulses from the count pulse source 44 will have been delivered to and counted by the binary counter 41. The number of counted pulses thus stored in 41 is representative of the amplitude of the analogue signal and is reflected as a unique set of binary voltage conditions on the output leads 7. Assuming that the contacts associated with the relay unit 8 are as shown, the binary voltages are made available on leads 9 for application to the sensing circuit 33.

The analogue to digital conversion of the input information available over lead 5 is carried on during the time interval when the scanner circuit 10 is sensing the label voltages available on leads 29 through 32. The timing is so arranged that the scanner operates without interruption upon completion of the sensing of the label information to sense the binary voltage conditions existing on the leads 9. The result is a serial train of pulses similar to that shown in block 13 of Fig. 2 wherein label information, identifying the analogue information to follow, is transmitted as the first portion 14 of the pulse train, and the signal or value of the analogue information desired to be communicated is transmitted as the remaining portion 15 of the pulse train.

After the binary information available on leads 29 through 32 and the output leads 9 associated with the word portion of the message has been serially read out by the scanner circuit 10, and made available as a pulse train on the output lead 11, the system, under control of the 6 cycle per second multivibrator 19, is then ready to process another analogue function. Thus the second control pulse from multivibrator 19 as previously described to drive the output shaft 27 of the rotary switch 22 to the next position, say position 5 of the rotary switches associated with the shaft 27. Simultaneously a preset 3 signal is applied to condition the scanner circuit for reading out the 12 binary information inputs, and a reset signal is applied to the binary counter 41 to reset the counter to its original or zero condition in time for storing a new signal indicative of the value of input information to be made available over lead 5. The rotary switches in positions 5 then apply a different label signal over leads 29 through 32, to the sensing circuit 33 and a corresponding analogue voltage over the lead 5 to the comparator circuit 49 for conversion to digital form. The scanner circuit 10 then sequentially scans each of its input leads 9 to deliver a pulse train as previously described. The pulse train comprises a new label now identifying the function being transmitted as a subscript 5 type, and the value of the subscript 5 type information.

This process of successively reading the various input information made available over lead 5 is continued until the control pulse, Fig. 4a, associated with rotary switch position 8, occurs. At this time the rotary switch is still in position 7. In position 7 the control pulse associated with switch position 8 is applied over lead 51 and the closed connection made by the last rotary switch assembly associated with the shaft 27 to a 140 millisecond delay multivibrator 52. This multivibrator delivers an output pulse, not shown, to winding 53 of relay 8 causing contact 54 to close. Closure of contact 54 permits a change of message groups depending upon which of group message selector push buttons A to D is engaged. Assume for purposes of discussion that push button A had been previously operated, such that the associated set of contacts 55 were closed, and the ratchet drive 56 associated with the push button A had released whatever push button had been previously engaged. Then various open and ground signal conditions would have been made available over leads 57 through 59. In the particular condition where the push button A is closed, a binary signal 110 would appear on leads 57 through 59 identifying that an A type message sequence is to be transmitted. When relay 8 operates, its associated contact 54 closes, applying B+ over lead 60 and a closed contact 55 of switch A to the winding of solenoid 61. Solenoid 61 operates, closing the contacts 62 associated with inputs $A_1, A_2, A_3, A_4 \ldots A_n$ and applying various A type information, subscripts $1, 2 \ldots n$, over leads 3 to the programmer 4.

When the control pulse, Fig. 4a, associated with rotary switch, position 8 of 22, has caused the shaft 27 to be rotated to position 8, the group identifying label 0001 appears on leads 29 through 32 which is processed through the scanning circuit in the usual manner. Since relay 8 has operated, the remaining contacts associated therewith have been closed to the right such that the sensing circuit 33 now has connected to its input, the leads 57 through 59 and the group of leads 14. After the group identifying label 0001 is read out by scanner 10, the group identifying code 110, corresponding to push button switch position A, associated with A type input analogue voltages, and appearing on leads 9 is read out in serial form. Leads 14 supply additional discrete message information which may be transmitted, as previously described, during the remaining portion of the group code message period. This additional information is sensed by the sensing circuit 33 without interruption after the identifying code has been sensed, and is made available on lead 11 as part of the pulse train, represented by 16 in Fig. 2.

After the group message has been composed and transmitted, the 140 millisecond delay multivibrator 52 returns to its original state. The resulting voltage developed at its output causes the solenoid 53 to become inoperative, thereby permitting the contacts associated with leads 9 and 7 to close and contact 54 to open. The next control pulse from multivibrator 19 causes shaft 27 to drive the rotary switches associated with 22 to position 1, and the sequence of label and message programming, encoding and transmission of analogue information $A_1$ to be accomplished. Subsequent pulses from 19 cause each remaining analogue information $A_2$, $A_3$, $A_4$ . . . $A_n$ to be individually processed and made available in binary form as parts of the message group A. When all of the analogue voltages associated with group A have been transmitted, the rotary switches of 22 will have reached a position where the next message to be transmitted is the group identifying message. If during this sequence of A messages, one of the other push buttons associated with group selection had not been pushed, the process previously described would continue without interruption. It should be noted, however, that upon pushing one of the other group identifying buttons, say B, the ratchet 56 associated with the push button B, releases button A such that upon completion of the A sequence the new sequence or group of messages B may be transmitted. When the newly selected push button B is operated, leads 57 through 59 acquire the new code designation associated with the new group. At the conclusion of the A sequence, the rotary switch will have been driven to position 8, the 140 millisecond delay multivibrator 52 would then generate a signal causing relay 8 to operate. Relay 8 operating, closes contacts 54, and connects the input leads 9 of the sensing circuit 33 to the discrete message input leads 14 and to the group code leads 57 through 59. In closing, contact 54 applies B+ over lead 60 through the closed contacts 55 associated with push button B such that the B solenoid 61 is energized. Operation of this solenoid causes ratchet device 63 to disengage the connections 62 previously made, and associated with the A sequence of messages, and close the connections 62 associated with the B messages sequence, permitting the B group of analogue inputs to be coupled to the input leads 3 associated with the sequential programmer and label generator 4. Subsequent control pulses from multivibrator 19 then operate to successively control the encoding and transmitting the individual messages $B_1$, $B_2$, $B_3$ . . . $B_n$ associated with the B group.

It should be noted, therefore, that by selection of the push button controls A, B, C, or D different groups of messages may be transmitted. If desired, a particular push button may be left in a fixed position thereby permitting that particular group of messages to be transmitted repeatedly at a rate determined by the multivibrator 19.

Whereas Fig. 3 illustrates a particular embodiment of applicants' invention, applicable to a message arrangement comprising a sequence of 7 individual analogue inputs in fixed order and available as one of four different groups A through D, it is obvious that the system is versatile enough to accommodate other sequence and group arrangements. The arrangement of Fig. 5 illustrates a more general embodiment of the invention permitting a selection of the number and type of functions to be transmitted as a group, the particular labels to be associated with each of the selected functions, and the sequence and recurrence with which the selected functions are to be transmitted. This selection is illustrated by the arrows associated with the program control unit 64 wherein the arrow 65 indicates a control of the number of functions to be transmitted in each group, the arrow 66 indicates a control determining the individual functions comprising each group and their sequence of occurrence, and the arrow 67 indicates a control determining the specific labels to be associated with each selected function. Depending upon the adjustment of these controls, control signals are transmitted as indicated by dotted lines 68, 69 to the label generator 174 and the analogue voltage selector 70. The label generator 174 has output leads 1 through $n$ over which the digital information defining the particular label selected by the program control unit 64, is made available to the scanner 10 of Fig. 1. The analogue voltage selector 70 operates under control of the program control unit 64 to sequentially direct each of the functions available in analogue form over input leads 71 to the output lead 5 for conversion to digital form and processing before transmission to a remote receiving station. The program control unit 64 operates under control of the signals supplied by the timing circuit 2 of Fig. 1. Correlating Figs. 5 and 3, it is noted that the analogue input voltage selector 70 of Fig. 5 may be considered to comprise the fifth bank of switches 22 reading from left to right associated with the input leads 3. The label generator may be considered to comprise the first four banks of switches having their outputs connected over leads 29 through 32. The program control unit 64 may be considered to comprise switches, not all shown in Fig. 3, for selectively connecting the analogue input functions available over contacts 62 to the fixed contacts associated with the rotary switch 22. Despite the flexibility with which the various encoding and programming processes may be carried on independently at the transmitting station, applicants' system is versatile enough to permit the receiving system to follow this programming and sort out the incoming messages and route them to predetermined output terminals without ambiguity.

In common with all pulse type transmission systems, a need exists for synchronizing the operations at the receiving stations with those performed at the transmitting station. In this connection start-stop synchronizing signals are generated at the transmitting station and transmitted simultaneously as part of the outgoing message. Referring to the Fig. 2 the synchronizing pulse 72 is shown as a negative going pulse having a duration corresponding to that of the label and associated message function duration. Referring to Fig. 3, the synchronizing pulse is generated by the flip-flop circuit 73. The first 100 cycle pulse from the scan gate 36 identifying a new message sequence trips the first flip-flop multivibrator 34 causing it to change state. The resulting signal on lead 74 causes the diode 75 to conduct and pass the negative signal to the synchronizing flip-flop circuit 73. The diode operates effectively to pass only the negative going outputs available from the output of the first flip-flop circuit 34. The negative going signal applied to the synchronizing flip-flop 73 causes 73 to deliver a negative going rectangular wave transmitted over output lead 76. The duration of this negative going wave is determined by a cycle of operation of the scanner circuit 10. The flip-flop 73 remains in the state established by the negative going signal applied over lead 74 until the scanner flip-flops 34 have counted 13 pulses, at which time the last flip-flop 34 causes a negative signal to be applied over lead 77 to return the synchronizing flip-flop 73 to its original state and terminate the duration of the synchronizing signal. The output of this last flip-flop 34 is also applied over lead 78 to the start-stop flip-flop 35 returning it to its original position and blocking further passage of any 100 cycle per second message pulses by the scan gate 36. The next control signal from the 6 cycle per second multivibrator 19 then operates in the previously described manner to cause the next message information associated with a selected group to be transmitted in sequence and made available in binary form on lead 11 together with an accompanying synchronizing signal on lead 76. The synchronizing and binary information message pulses may be transmitted directly over separate leads 11 and 76 to remote receiving stations. However, various other schemes are available for transmitting this information to a remote receiving station. In one particular embodiment the message information was transmitted as frequency modulation of a carrier, whereas the synchronizing signals were made available as amplitude modulation of the same carrier.

The purpose of the receiver is to decode and route the incoming messages to the proper output terminals under control of the synchronizing signals. The operation as shown in Fig. 6 is performed as follows. The timing and control circuit 79 operates in response to each synchronizing pulse available over lead 76 to perform operations both during and a short time after the message receiving interval. During the message receiving interval, control signals are provided by circuit 79 over lead 80 to the serial to parallel binary signal converter 81 for causing the binary information available in serial form over lead 11 to be transferred into parallel form available on leads 82. The converter 81 may comprise any well known form of shifting register which is capable of providing each binary increment of a serially received message on a respective output lead 82. At the conclusion of a synchronizing signal received over lead 76, and corresponding to the end of a received message, a signal is developed by circuit 79 over lead 83 which transfers the binary information available in parallel form on leads 82, and representative of the received message, to an intermediate storage unit 84. As soon as the binary information available in parallel form on lead 82 is transferred to the intermediate storage unit 84, the serial to parallel converter 81 is ready to accept another message. The advantage of this arrangement is that while the next message is being set up in the converter 81, the previous message may be processed and routed to a desired output lead with a minimum of delay.

As soon as the information is stored in the intermediate storage unit 84, a further signal is developed by the timing and control circuit 79 on lead 85. This signal causes the label decoder and input information transfer unit 86 to operate in response to the label information available on leads 87 and route the binary information, associated with the particular input message being processed, to a predetermined group of output leads 88. Each of the output lead groups 88 is associated with a respective final storage and digital to analogue converter 89. In one particular embodiment to be described shortly, the digital to analogue converter 89 stores the binary information as a plurality of relay operating conditions, and converts the digital information to analogue form for transmittal over leads 90 to the group transfer circuit 91. Assuming the group transfer circuit 91 had been conditioned to transfer each received information to a group A terminal, then the information available on leads 90 would have been transferred to a selected one of terminals $A_1$, $A_2$, $A_3$ ... $A_n$.

Assuming now, that the label decoder had sensed a group label on the input leads 87, a signal would have been transmitted over leads 92 and 93 to the group word decoder 94 and discrete message decoder 95, respectively to become operative at the proper time. The group word decoder 94 operates in response to the group word information available over leads 96 to supply a signal over cable 97 to the group transfer circuit 91 conditioning it to route the information available over its input leads 90 to one group of output leads 98. For example, if the group word decoder 94 has sensed the group word associated with B, then each of the input leads 90 would have been coupled to a respective one of the $B_1$, $B_2$, $B_3$ ... $B_n$ output leads. The discrete message decoder 95 operates in response to the information available from 84, which defines the received message information, to effect desired interconnections of the output leads 100. Thus it is seen that depending upon the programming established at the transmitting station, the receiving unit operates in response to the synchronizing pulses and the group and label information to route the successively received input messages to the proper output channels. The timing is carefully controlled such that the input information may be processed and routed at the rate at which it is received.

A detailed embodiment of the arrangement of Fig. 6 is shown in Figs. 7a and 7b. The receiving unit illustrated there has been arranged to operate with the specific transmitting arrangement shown in Fig. 3. The gated 100 cycle oscillator 101 operates during the time that a synchronizing signal is being received over lead 76 to transmit 100 cycle pulses to the blocking oscillator 102. The blocking oscillator, acting effectively as a pulse shaper and power amplifier, delivers pulses at a 100 cycle per second rate to the various stages of a twelve stage shifting register 103. This shifting register well known to those skilled in the art, operates in response to the message input signals available from the input circuit 104 and lead 11, to deliver the binary information representative of the message available in parallel form at the output leads 82, at the end of a message interval. The electron discharge devices 105 through 116, and their associated relays 117 comprise the intermediate storage unit 84 of Fig. 6. The electron discharge devices 105 through 116 are normally inoperative since their common cathodes are disconnected from ground by the open switch contacts 118 of relay 119. It should be noted that the synchronizing signal is also applied over lead 76 to the trailing edge sensing circuit 120 which operates to deliver a control signal at the termination of the synchronizing signal. The sensing circuit 120 may, in a particular embodiment, comprise circuits for sensing the length and continuity of the synchronizing signals and delivering an output signal only when the received pulse is acceptable within prescribed limits. For further details of the operation of one form of this circuit, reference may be made to the copending application of Daniel Hurley, Serial No. 389,535, entitled Electrical Signal Sensing Circuit, filed November 2, 1953, and assigned to the same assignee. Assuming the incoming synchronizing signal is of acceptable form, the output pulse from circuit 120 operates delay mutivibrator and pulse amplifier 121 to deliver a pulse of sufficient power and length to operate the solenoid associated with relay 119. The relay 119 is of the make-before-break type which operates to effect closure of contacts 118 before contacts 122 are opened, and conversely upon release, the closing of contacts 122 before contacts 118 are opened. The output signal from 121 energizes the solenoid associated with relay 119 causing the contacts 118 to close and thereby connect the cathodes of each of the electron discharge devices 105 through 116 to ground. Subsequently the contacts 122 are opened, thereby removing ground from the bus 123. Each of the electron discharge devices 105 through 116 will conduct or not depending upon the binary information available at their respective input lead 82. This binary information may exist as one of two voltage conditions, for example zero and some negative value. The negative voltage should be of sufficient amplitude to render the devices not conductive, whereas the zero voltage should permit the respective devices 105 through 116 to conduct and energize their associated relay windings 124. Wherever a winding 124 is energized, its associated contacts 125 are closed, connecting the winding between B+ and the bus 123. However, since the contact 122 is open, the circuit through the relay winding 124 can be maintained in an operative condition only through conduction of its respective electron discharge devices 105 through 116. It can be seen now that the operation or non-operation of the relays 117, and hence the condition of the contacts 125 represents the binary information available over each of the output leads 82 from the shifting register 103 associated therewith. At the completion of the time interval established by the output pulse from circuit 121 the relay 119 is deenergized thereby causing contacts 122 to close before contacts 118 open. Closing of contacts 122 connects the bus 123 to ground. It can be seen now that the windings 124 have been energized or not to reflect the binary voltage available at the input lead 82 of their respective electron discharge devices 105 through 116. Had a winding 124 not been operated because of the negative voltage available on the input lead 82, its associated contact 125 would have remained open. Had the input lead, however, been energized with the zero voltage, its associated contacts 125 would now be closed. Also had any of the windings 124 been energized to an operative condition because of a previous message, the winding would now have been deenergized if the signal available at its associated input lead 82 had changed to be a negative voltage.

Referring to Fig. 4k, it should be noted that during receipt of the synchronizing pulse, the incoming message information is being shifted into the register 103. Upon the termination of the synchronizing pulse, a signal is developed by the trailing edge sensing circuit 120 for operating the delay multivibrator and pulse amplifier 121. The latter circuit in turn develops a signal for transferring the message information, stored in the register 103, in parallel form to the intermediate storage unit 84 shown in Fig. 6, which comprises relays 124 and certain associated contacts. The time for this latter transfer amounts to only a small portion of the time interval between succeeding synchronizing pulses. The minimum time between successive messages is determined by the transfer time of the intermediate storage unit 84 and in particular upon the operating time of the relays contained therein. Anytime after the intermediate storage unit has operated to store a newly received message, the shifting register 103 is able to accommodate the next succeeding message. Thus, referring to Fig. 8q the positive going delayed multivibrator output pulse from 121 determines the operating time for the intermediate storage unit.

The delay multivibrator and pulse amplifier 126 responds to the trailing edge of the output pulse from unit 121 to deliver a corresponding positive going, but delayed pulse as shown in Fig. 8r over lead 85 to the label decoder and input information transfer unit 86 shown in Fig. 6. In particular, this signal is applied through the various ganged contacts 127 which are associated with the relay windings 124 of the electron discharge devices 113 through 116. It should be remembered that these electron devices establish the label information for the successively received messages. Depending upon which of the windings 124 associated with the devices 113 through 116 have been energized, the associated contacts 127 have been either opened or closed. The overall condition of the relay contacts 127 results in a single unique conducting path being provided for the output pulse from 126 over lead 85 to a specific one of the relay windings 128 associated with a respective final storage and digital to analogue converter unit 89. For example, if a sub-seven message had been stored in the intermediate storage unit 84, device 113 would have been in a non-conductive state, whereas devices 114, 115, and 116 would have been in a conductive state during the time of occurrence of the output pulse from 121. This combination of conductive and non-conductive states corresponds to the digital code designation 1110, and is representative of the sub-seven message. Because of the conduction of electron discharge devices 114, 115 and 116, only the associated label intermediate storage relay windings 124 would have been energized, closing their associated holding contacts 125 and the associated contacts 127, mechanically coupled thereto as shown by the dotted lines 129. This results in a closed circuit connection being provided between lead 85 and the relay winding 128 associated with the sub-seven register, or final storage and digital to analogue converter No. 7. Upon energization of the relay winding 128, the contacts 130, mechanically coupled together by the linkage 131 shown in dotted line, are closed to the right. Closing of contacts 130 connects the relay windings 132 between ground and the upper contacts 132' associated with each of the relay windings 124. Depending upon the digital information stored in the relay windings 124 associated with electron devices 105 through 112, the related contacts 132' would be closed or not. For example, if the digital information stored had a value represented by the binary number 10101010, the contact 132' associated with devices 112, 110, 108, and 106 would have been closed, connecting B+ over leads 133 through 136. If in addition, the associated contacts 130 were closed due to the energizing of relay coil 128 by a pulse from circuit 126 via contacts 127, B+ would have been conducted through the associated contacts 130 and the associated relay windings 132 to ground. The energized relay 132 then operates to close their associated lower holding contacts 137 permitting B+ to be applied through respective current limiting resistors 138 to associated open contacts 130. The remaining relays 132 would be non-energized since their associated lower terminals would be disconnected from the B+ source by the associated open contacts 132' associated with electron devices 105, 107, 109, and 111. Had the relays 132 been previously in an operative condition due to a previously inserted message they would now release. At the conclusion of the pulse shown in Fig. 8r and available from circuit 126 the relay winding 128 is deenergized thereby restoring contacts 130 to their original inoperative condition. The relay 128 is of the make-before-break type similar to relay 119, permitting the left hand set of contacts associated with 130 to be closed before the right hand set of contacts associated therewith are opened. The same results could also be obtained by arranging that the relays 132 are of a slow-acting-slow release variety. Those relays 132 which were previously placed in an inoperative condition remain so, whereas the relay windings subsequently placed in an operative condition, as for example those associated with the leads 133 through 136, are kept in an operative condition because the relay windings in their operative condition had closed the contacts 137 which established the path from B+ through the respective current limiting resistors 138, the closed contacts 130 and the relay winding 132 to ground. It can be seen, therefore, that the condition of the relays 132 now represents the condition of the relays 124 which in turn represents the digital information, or the message value stored previously in the shifting register 103.

A resistor 139 is associated with each of the contacts 140. The resistance network, comprising resistances 139, operates to process applied voltages in a manner to accomplish digital to analogue conversion of a binary signal. In the particular embodiment shown, each of the resistors 139, reading from right to left, is twice the resistance value of the preceding resistance. This implies that the resistor 139 associated with lead 136 provides the most significant digit, and that the succeeding resistances 139, reading from right to left, provide successively less significant digits. For the previous example cited, wherein the contacts 140 associated with leads 133 through 136 would have been closed to their upper position, the associated resistances 139 would have been connected by the closed contacts 140 between the voltage source 141 and the common output leads 90. The remaining resistors 139 would have been connected between the output lead 90 and ground, thereby providing the desired voltage divider action for obtaining a digital to analogue conversion. The value or amplitude of the voltage available from source 141, which may be of direct current or alternating current form, establishes the excursion of the range of analogue output values. If a different combination of contacts 139 had been closed, then a correspondingly different output analogue signal, representative of the message information received by the register 103, would have been developed on the output lead 90.

The operation of the remaining relays 128' is similar to that described in connection with relay 128 in that each relay responds to a particular label code set up by the electron discharge devices 113 through 116 depending upon the received information. Each of the relays 128' has associated with it a respective series of eight contacts 130 and a respective series of eight relays 132. Each of the relays 132 has contacts 137 and 140, resistors 139, and a common output lead 90 associated with it. The voltage source 141 may be common to all digital to analogue converters if desired. Thus, during a sequence of messages 1 through $n$, received in any particular group, the various relays 128' are operated under the control of the received message label to route the received message information to its respective final storage and digital to analogue converter circuit 89. It should be noted that this process is carried on independently of what group of messages was being processed.

Depending on the group identifying code received at the receiving unit, one of the output contacts 142 is closed, say that corresponding to the group code A, connecting the various output leads 90 associated with each of the storage units and digital to analogue converters 89 to respective output leads $A_1, A_2, A_3 \ldots A_n$.

The manner in which a new group code message is processed will now be explained. The incoming message in digital form and representative of a group code message, is processed through the timing and control circuit 79, the serial to parallel converter 81, and the intermediate storage unit 84 in a manner similar to that described in connection with Fig. 6 with respect to an information message. The condition of the electron discharge devices associated with the label portion of the incoming message, however, would have been operated to indicate that a group code message was being processed. In the present embodiment, a group code message label is represented by the binary code 0001 in which case only the electron discharge device 113 would have been rendered conductive during the time occurrence of the output pulse from circuit 121. Operation of electron discharge device 113 to a conductive state causes its associated winding 124 to become energized closing the associated contacts 125 and 127. Closure of the latter contacts results in a closed circuit being established between the output of circuit 126, the contacts 127, and the relay winding 143, causing this latter winding to become operative and close contacts 144 by means of the push rod or mechanical linkage 145. Closure of contacts 125 establishes the normal holding circuit for associated relay 124. Let it be assumed that the message associated with the group code label received is representative of C type information. In the specific embodiment disclosed, this implies that the three digits immediately following the label portion of the received message would be represented by the binary code 101, in which case electron discharge devices 112 and 110 would have been rendered conductive and device 111 nonconductive during the time interval of the pulse output from circuit 121. Operation of selected ones of the devices 110 through 112 results in corresponding ones of the associated relay windings 124 becoming energized causing contacts 146, 147 and 148 to become or remain closed by operation of the mechanical linkages associated with the windings 124. During the time interval of the output pulse from 126, relay winding 143 is energized, causing linkage 145 to close contacts 144. This establishes a path from B+ through contacts 144, 146, 147, 148 and the relay winding 149 to ground. Energization of relay winding 149 closes the electrical contacts 150 associated with each of the C type output terminals of the final storage and digital to analog converter units 89 by means of the mechanical linkage 151. The closing of the various contacts 150 establishes a circuit from the output leads 90 associated with each of the final storage and digital to analogue converter units 89 to their respective outputs $C_1, C_2, C_3 \ldots C_n$.

By inspection it can be readily seen that depending upon the group code message received, the output leads 90 associated with the final storage and digital to analogue converter units 89 are connected to appropriate output channels, A, B, C, D . . . X, depending upon the size of the system involved.

It should be noted that depending upon the group code previously received, one of the relay windings, corresponding to winding 149, associated with each of the output information channels A, B, C, D . . . X needs to be maintained in an operative condition until the succeeding group code message is received. The holding circuit for maintaining the relay 149 associated with the C output channel operative will now be described. It should be noted that a second circuit exists from the B+ side of the relay winding 149 through the closed contacts 152, 153 and 154 to B+. Thus upon the termination of the output pulse from circuit 126, B+ power is removed from the first mentioned circuit because of the release of relay winding 143, while the second holding circuit for B+ power is maintained. Upon receipt of a new and different group code message, one of the contacts 152, 153 or 154 would become opened thereby releasing the previously engaged relay winding 149, and, as can be seen, permitting a new relay winding, corresponding to the newly selected output channel, to be held operative. For each of the relay windings corresponding to 149 associated with each of the desired output channels a unique holding circuit is provided. This holding circuit operates to maintain the transfer of received messages to the proper output channel corresponding to the group code last received.

Associated with each group code message there is a discrete message portion immediately following. In the present embodiment, accommodations are provided for handling four discrete message possibilities. Three of these are momentary contact closures for the period of time established by the output pulse from 126. In particular, contact closures between points 155 and 156, and/or between 155 and 157, and/or 158 and 159. In addition, a discrete message output is available in the form of a normally closed contact which is opened between points 160 and 161 until a subsequent message is received to close the contact. In this embodiment, the four digital positions following the group code message interval determine the discrete message being received. The fourth, sixth and seventh digits of the message portion determine or control the momentary contact closures. The fifth digit controls the contact opening between points 160 and 161. The contacts 162 are opened by the mechanical linkage 163 whenever its associated relay winding 124 is energized due to conduction of electron discharge device 107. The circuit between points 155 and 156 through the closed contact 162 is completed by closure of the contact 172 during the period when the relay winding 143 is energized by the output pulse available from circuit 126. In a similar manner the circuit between 155 and 157 will be closed when or if the contact 164 is closed under control of the electron discharge device 106 and its associated relay winding 124. This same process is repeated whenever a circuit is completed between points 158 and 159 through the contacts 173 and 165, under control of electron discharge device 109. During the occurrence of the output pulse from circuit 126, and corresponding to the period when a group message is received, contacts 166 are closed under control of the relay 143 thereby providing B+ to the relay winding 167 if the contacts 168 are also closed. It should be remembered that the closure of contacts 168 is determined by the discrete message information being received, and the subsequent conduction and operation of electron discharge device 108 and its associated relay winding 124, respectively. As soon as relay 167 is energized, its associated contacts 169 are closed, thereby establishing a holding circuit to B+ through the normally closed contacts 170 associated with the winding 143. Operation of relay 167 also open contacts 171, thereby providing the open circuit between points 160 and 161. This open circuit condition is maintained until a discrete message is received during a group code message which would result in opening contact 168. It should be noted that the contacts 166 and 170 associated with the relay winding 143 are of the make-before-break type as previously described.

While specific message decoding circuits have been described in connection with the embodiment shown in Figs. 6 and 7 it is obvious that other decoding schemes well known in the art may be employed.

While a specific embodiment has been shown and described, it will, of course, be understood that various modifications may yet be devised by those skilled in the art which will employ the principles of the invention and lie within the true spirit and scope thereof.

What we claim as new and desire to secure by Letters Patent of the United States is:

1. A method for conserving time in a communication system which comprises generating one portion of a message while converting another related portion of the message containing routing information from one form of modulation to another, forming a complete message by combining said related portions in time sequence, and timing said generating and converting relative to one another to effect said combining without time interruption.

2. A method of signal communication which comprises processing one portion of a message while simultaneously converting another related portion of the message containing routing information from one form of modulation to another, forming a complete message by combining said related portions in non-overlapping time sequence, and timing said processing and converting relative to one another to permit said related portions to be combined into a single, continuous message.

3. A method for conserving time in a message communication system which comprises transmitting one portion of the message to a remote receiving station while simultaneously converting another related portion of the message containing routing information from one form of modulation to another, and forming a complete message by transmitting said converted portion to said station after said one portion is transmitted in a manner to form one continuous transmitted message.

4. A method for conserving time in a pulse code modulation communication system which comprises generating one portion of a message in pulse code modulation form while simultaneously converting another related portion of the message containing routing information from one form of modulation to pulse code modulation and forming a complete message by combining said related portions into a continuous pulse code sequence.

5. A method for conserving time in a pulse code modulation communication system which comprises generating one portion of a message in pulse code modulation form while converting another related portion of the message containing routing information from one form of modulation to pulse code modulation, forming a complete message by combining said related portions in time sequence, and timing said generating and converting relative to one another to permit said related portions to be combined into a train of pulse code modulated pulses.

6. A method for communicating a plurality of analog information, comprising sequentially converting each analog information from analog to binary pulse code form while simultaneously transmitting a related label in binary code form identifying each analog information, transmitting each of said converted information while in digital form without interruption at the conclusion of each related label transmission receiving said transmitted information and related labels, decoding said received labels, routing each of said plurality of received information under control of its related received decoded label to a separate output channel, and receiving a subsequently transmitted information and related transmitted label after commencing the routing of the previously received information to its separate output channel under the control of its related received label.

7. A method for communicating a plurality of analog information, comprising sequentially converting each analog information from analog to binary pulse code form while simultaneously transmitting a related label in binary code form identifying each analog information, transmitting each of said converted information while in digital form without interruption at the conclusion of each related label transmission, receiving said transmitted information and related labels, decoding said received labels, routing each of said plurality of received information under control of its related received decoded label to a separate output channel, and receiving a subsequently transmitted information and related transmitted label while routing the previously received information to its separate output channel under the control of its related received label.

8. An arrangement for conserving time in a message communication system which comprises means for transmitting one portion of said message, means for simultaneously converting another portion of said message containing information for routing different portions of said message from one form of modulation to another, and means for transmitting said converted message portion after said one portion and as part of the same message.

9. An arrangement for communicating a plurality of input information each available on a number of different input leads, comprising means for selecting said information in a predetermined sequence, means for changing said sequence, means for processing said information to produce a desired output, means for generating a label in digital form identifying the leads associated with the selected information and means for transmitting said label followed by said associated selected information.

10. An arrangement for communicating pulse coded messages comprising a source of analog signals, means for converting each of the analog signals from analog to digital form in non-overlapping time sequences a source of label signals, means for transmitting a label signal in digital form identifying each of the analog signals simultaneously with the converting of said last named signals, means for transmitting each of said converted analog signals in digital form immediately following its corresponding label signal and before converting another analog signal, means for receiving said transmitted signals and simultaneously de-coding a label signal while converting the received converted analog signal of the preceding transmission back to analog form.

11. An arrangement for communicating pulse coded messages comprising a source of analog signals, means for converting each of the analog signals from analog to digital form in non-overlapping time sequence, a source of label signals, in digital form each identifying a respective analog information, means for transmitting each of said label signals, while its associated analog signal is being converted, followed by its associated analog signal, means for receiving said transmitted signals, a digital to analog converter, means for routing a received signal in digital form to said last named converter under control of its associated label while simultaneously receiving a subsequently transmitted signal.

12. An arrangement for communicating a plurality of information comprising, means for converting each information to a different form of modulation while simultaneously providing a label in said different form of modulation identifying the information being converted, means for transmitting each of said converted information while in said different form of modulation as part of non-overlapping message sequence consisting of a transmitted label and its related converted information, means for receiving said transmitted information and related labels, a plurality of output circuits, and means for routing each of said plurality of received information under control of its related received labels to a separate one of said plurality of output circuits.

13. A method for communicating a plurality of information available at various groups of input terminals to associated groups of output terminals comprising, selecting information from said groups of input terminals, forming a plurality of function messages from said selected information, each of said function messages comprising a label portion followed by a related one of said selected information, transmitting said function messages in a desired, non-overlapping time sequence, each of said label portions identifying the input terminal within a group associated with its related information, generating and then transmitting a group identifying message so as to appear first in said sequence, said group identifying message comprising a label portion identifying the group identifying message as a group identifying message followed by a word portion, said word portion identifying the group with which the information in the following function messages are associated with.

14. A method for communicating a plurality of information available at various groups of input terminals to associated groups of output terminals comprising, selecting information from said groups of input terminals, forming a plurality of function messages from said selected information containing a label portion followed by a related one of said selected information, transmitting said function messages in a desired, non-overlapping time sequence, identifying the input terminal within a group associated with its related information by each label portion, generating and then transmitting so as to appear first in said sequence a group identifying message having a label portion identifying the group identifying message as a group identifying message followed by a word portion identifying the group with which the information in the following function messages are associated, receiving each message of said sequence, routing each received message to a common intermediate storage unit, routing under control of each stored function message label portion its related selected information to a selected one of a plurality of final storage units, routing in response to the label portion of the group identifying message and under control of the associated word portion the information stored in the final storage units to an associated group of said output terminals.

15. An arrangement for communicating the value of a plurality of analog functions available at various groups of inputs terminals to selected groups of output terminals comprising means for successively sampling the functions at said input terminals and deriving the values thereof, a source of a plurality of label signals, means for combining said derived values and said label signals into a plurality of function messages, each of said function messages comprising a label signal followed by a related derived function value, means for transmitting said function messages in a desired, non-overlapping time sequence, each of said label signals identifying the input terminal within a group associated with its related function, means for generating a group identifying message, means for transmitting said group identifying message as the first message in said transmitted sequence, said group identifying message comprising a label signal identifying the group identifying meassage as a group identifying message following by a word portion, said word portion comprising a first part identifying the group with which the information in the following function messages are associated and a second part comprising discrete message information.

16. An arrangement for communicating the value of a plurality of analog functions available at various groups of inputs terminals to selected groups of output terminals comprising means for successively sampling the functions at said input terminals and deriving the values thereof, a source of a plurality of label signals, means for combining said derived values and said label signals into a plurality of function messages, each of said function messages comprising a label signal followed by a related derived function value, means for transmitting said function messages in a desired, non-overlapping time sequence, each of said label signals identifying the input terminal within a group associated with its related function, means for generating a group identifying message, means for transmitting said group identifying message as the first message in said transmitted sequence, said group identifying message comprising a label signal identifying the group identifying message as a group identifying message followed by a word portion, said word portion comprising a first part identifying the group with which the information in the following function messages are associated and a second part comprising discrete message information, a first storage unit, a common intermediate storage unit, a plurality of final storage units, means for receiving each message of said sequence at said first storage unit for storage, means for routing each received stored message to a common intermediate storage unit, means responsive to each stored function message label signal for routing its related information to a selected one of said plurality of final storage units, first, second and third circuits, means responsive to the label signal of the group identifying message for routing the first and second parts of the associated word portion to respective ones of said first and second circuits, said first circuit responsive to the first part of the group identifying message for controlling the routing of the information stored in said final storage units to an associated group of output terminals, said second circuit responsive to said discrete message information for controlling the operation of said third circuit.

17. An arrangement for processing a plurality of separate messages comprising, means for multiplexing a selected number of said messages in a desired time sequence, means for transmitting said sequence, each of said messages comprising a word portion associated with a label portion identifying the word, one of the messages in each sequence comprising a label identification portion identifying the meaning of the labels contained in the remainder of the sequence associated with said one label identifying portion, means for substituting different words in said sequence to be transmitted while retaining said labels, and means for correspondingly changing the label identification portion of said one message.

18. A signal processing system comprising a plurality of separate functions, means for supplying a smaller plurality of labels, means for selecting an equal smaller plurality of functions from said plurality of separate functions, means for sampling each of said selected functions to derive the values thereof, means for processing each of said values into a form suitable for transmission, means for transmitting each of said labels and its respective processed value, means for transmitting another message before said sequence comprising a label identification portion, identifying the meaning of the labels contained in the following sequence, associated with a label identifying said another message as a label identification portion, means for selecting functions from said plurality of separate functions to comprise a different sequence to be transmitted, and means for changing the label identification portion of said message to correspond to the functions selected to comprise said different sequence.

19. An arrangement for communicating a plurality of analog information each available on a number of different input leads comprising means for selecting predetermined ones of said information to comprise a group, means for sequentially sampling the selected information within said group, means for converting the selected information from analog to digital form, a source of a plurality of label signals each in digital form, each of said label signals identifying a unique input lead associated with said selected information, means for transmitting each of said selected information and its associated label as a message comprising means for transmitting a label while converting its associated selected information to digital form, and means for transmitting each of said converted information after its associated information and as part of the same message, means for selecting a group of predetermined information different from that contained in said first group to comprise a second group, means for producing a group identification signal in digital form, said identification signal uniquely identifying said second group of information, a source of a group label signal in digital form, means for transmitting said group label signal followed by said second group identification signal, and means for transmitting said second group of information after said last named transmission.

20. An arrangement for communicating a plurality of information available at various groups of input terminals to selected groups of output terminals comprising means for sequentially sampling each information, a source of a plurality of label signals, means for combining each of said sampled information with a respective label signal to form a plurality of function messages, each of said function messages comprising a label signal followed by a related information, each of said label signals identifying the input terminal within a group associated with its related information, means for transmitting said function messages in any arbitrary, non-overlapping time sequence, means for generating a group identifying message, means for inserting said group message as the first message in the transmitted sequence, said group identifying message comprising a unique label signal, identifying the message as a group identifying message followed by a word portion, said word portion comprising a first part identifying which group of input terminals the information in the following function messages are associated with and a second part comprising discrete message information, a first common storage unit for receiving each message of said sequence for storage, a common intermediate storage unit, a plurality of final storage units, means for routing each received stored message to said common intermediate storage unit, means responsive to each stored label signal of a function message for routing its associated information portion to a selected one of said plurality of final storage units, first, second and third circuits, means responsive to the label signal of the group identifying message for routing the associated first and second parts of the group message information to respective ones of said first and second circuits, and said first circuit responsive to said discrete message information for controlling the operation of said third circuit.

21. An arrangement for communicating a plurality of analog information available at various groups of input terminals to selected groups of output terminals comprising means for sequentially sampling and converting each information, to digital form, a source of a plurality of label signals, in digital form, means for combining each of said sampled digital information with a respective label signals to form a plurality of function messages, each of said function messages comprising a label signal followed by a related information, each of said label signals identifying the input terminal within a group associated with its related information, means for transmitting said function messages in any arbitrary, non-overlapping time sequence, means for generating a group identifying message in digital form, means for inserting said group message as the first message in the transmitted sequence, said group identifying message comprising a unique label signal in digital form identifying the message as a group identifying message, followed by a word portion in digital form, said word portion comprising a first part identifying which group of input terminals the information in the following function messages are associated with and a second part comprising discrete message information, a first common storage unit for receiving each message of said sequence at a first storage unit for storage, in digital form a common intermediate storage unit, a plurality of final storage units, means for routing each received stored message to a said common intermediate storage unit, for storage in digital form, means responsive to each stored label signal of a function message for routing its associated information portion in digital form to a selected one of said plurality of final storage units, for storage in digital form, said final storage units converting said stored digital information to analog form, first, second and third circuits, means responsive to the label signal of the group identifying message for routing the associated first and second parts of the group message information to respective one of said first and second circuits, and said first circuit responsive to said discrete message information for controlling the operation of said third circuit.

References Cited in the file of this patent

UNITED STATES PATENTS

| | | |
|---|---|---|
| 2,152,772 | Potts | Apr. 4, 1939 |
| 2,438,908 | Goodall | Apr. 6, 1948 |
| 2,495,739 | Labin et al. | Jan. 3, 1950 |
| 2,516,587 | Peterson | July 25, 1950 |
| 2,530,957 | Gilman | Nov. 21, 1950 |
| 2,536,578 | Slayton | Jan. 2, 1951 |
| 2,625,604 | Edson | Jan. 13, 1953 |